June 19, 1962     P. CARDI     3,039,510
TIRE VALVE STEM CLIP
Filed May 19, 1958

INVENTOR.
PAUL CARDI
BY
ATTORNEY 3,039,510
TIRE VALVE STEM CLIP
Paul Cardi, Cranston, R.I., assignor to Carlan Instruments Co. Inc., Cranston, R.I., a corporation of Rhode Island
Filed May 19, 1958, Ser. No. 736,329
2 Claims. (Cl. 152—427)

My present invention relates to automotive tire equipment and more particularly to a novel valve stem clip.

The principal object of the present invention is to provide a device for preventing the valve stem from dropping into the tire casing when the tire is run flat.

A further object of the present invention is to provide a valve stem clip which can easily be attached to the valve stem without strapping or bolting.

Another object of the present invention is to provide a valve stem clip which can easily be locked to the valve stem.

A further object of the present invention is to provide a valve stem clip which is simple in construction and easy and economical to manufacture and assemble.

With the above objects and advantageous features in view, my invention consists of a novel arrangement of parts more fully disclosed in the detailed description following, in conjunction with the accompanying drawings, and more particularly defined in the appended claims.

Heavy vehicles with dual tires are normally equipped with long valve stems for easy access during inflation of the tire. If one or more of the dual tires develops a leak or puncture so that the tire is flattened, the valve stem is frequently pulled into the tire casing causing considerable damage to the tire and tube. The present invention therefore provides a simple and effective clip which can be readily slipped on to the valve stem to lock it in position outside of the tire regardless of running conditions. The device of the present invention therefore retains the valve stem at the wheel rim so that it cannot be pulled into the tire casing.

Figure 1:
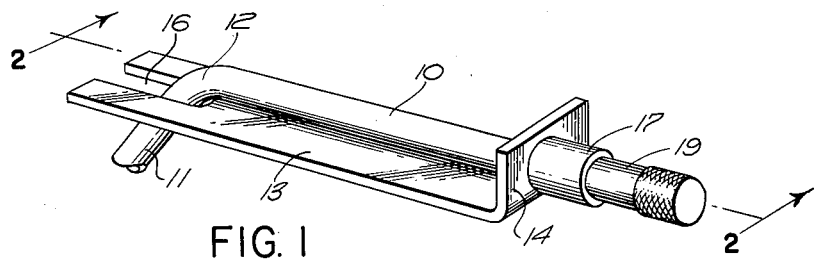
FIG. 1 is a perspective view of a valve stem clip mounted on the valve stem.
Figure 2:
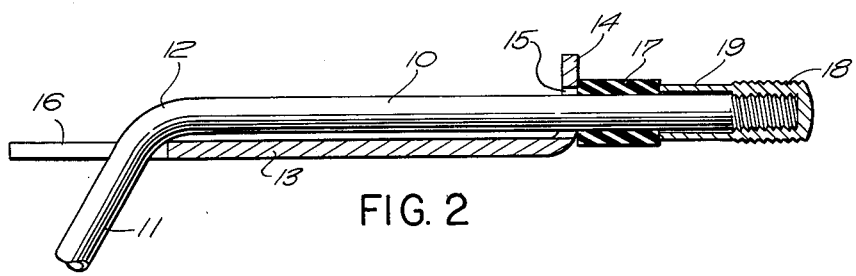
FIG. 2 is a longitudinal section taken on line 2—2 on FIG. 1.

Referring to FIGS. 1 and 2, the valve stem 10 extends from the wheel rim with a short upwardly inclined portion 11 and is then bent sharply at 12 so that the stem body 10 extends substantially horizontally just above the inside surface of the wheel rim. The clip of the present invention comprises an elongated flat strip of rigid material 13, preferably of metal which is bent upwardly at 14 to form a short integral vertical portion at the forward end. The portion 14 is provided with an opening 15 having a larger diameter than the valve stem 10 so that the valve stem will easily pass through it. At the rear of the strip 13, the strip is forked by providing a deep U-shaped slot 16. The width of the slot 16 is also slightly larger than the diameter of the valve stem 10 for easy handling.

In use the clip is slipped under the horizontal portion of the valve stem 10 so that the valve stem slides through the opening 15 and the slot 16 engages the valve stem at the bend 12 as shown in FIGS. 1 and 2. The valve stem is then locked to the clip by slipping an enlarged collar 17 over the end of the stem and pushing it against the vertical portion 14 of the clip. The collar 17 may be of metal or rubber and should have a larger diameter than the opening 15. The valve stem cap 18 is provided with an elongated unthreaded shank 19. When the cap 18 is slipped over the end of the stem and threaded into locking position the shank 19 will bear against the end of the collar 17 to pull the stem tightly into the clip and lock it in position. If a blowout or flat develops, the valve stem cannot pull into the small opening because of the clip 13 to which it is locked.

Figure 3:
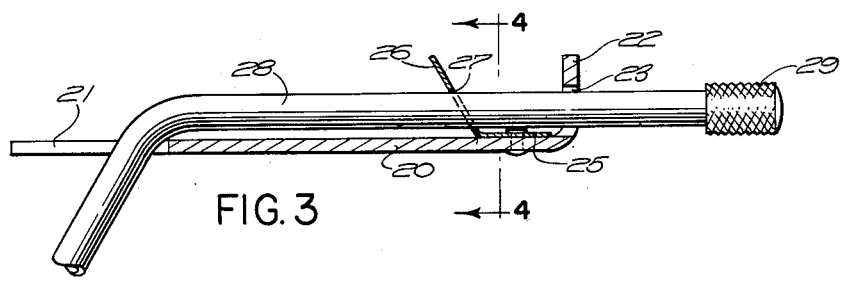
FIG. 3 is a view similar to FIG. 2 showing another form of my invention.
Figure 4:
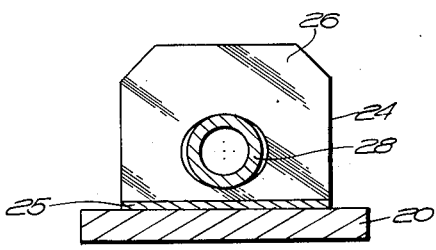
FIG. 4 is a transverse section taken on line 4—4 on FIG. 3.

Another method of locking the clip to the valve stems is illustrated in FIGS. 3 and 4. In this form the clip body 20 is formed similarly to the form shown in FIG. 1, having a forked end 21 and an integral vertical portion 22 with the opening 23. In front of the opening 23 a spring plate 24 made of thin spring steel is provided with a base portion 25 which is riveted or otherwise attached to the clip 20. At the rear edge the body of the plate 24 extends upwardly at an angle to form a spring portion 26 having an opening 27 which is slightly larger than the diameter of the valve stem 28.

When the thumb and forefinger are used to grasp the upper edge of the clip portion 22 and the spring portion 26, the portion 26 can be bent towards the vertical position with a spring action to align the holes 23 and 27. The clip can then be slipped on to the valve stem 28 with the fork portion positioned at the bend and the valve stem passing through the openings 23 and 27. When the spring portion 26 is released it will return to the position shown in FIG. 3 and clamp the valve stem in the opening 28 as shown in FIG. 4. The frictional engagement will also prevent withdrawal of the stem so that it is locked in position. A standard valve cap 29 can now be used at the end of the valve stem 28. To remove the clip, the valve cap 29 is unscrewed and the spring portion 26 squeezed towards the vertical position to release the valve stem and permit the clip to be slipped off.

The above construction is an improvement over the forms shown in FIGS. 1 and 2 in that the use of a separate collar 17 is eliminated and there is no need for a special valve cap. Both constructions effectively lock the clip to the valve stem and prevent the valve stem from being drawn into the tire casing should the tire be run flat. The clips are simple in construction and can readily be manufactured from stamped parts. Other advantages of the present invention will be readily apparent to a person skilled in the art.

I claim:

1. The combination with a tire, inner tube and rim assembly including an angular valve stem secured to said inner tube and having a short portion extending in a radial direction from the inner tube through an aperture in the central portion of the rim and a continuing angularly related laterally extending portion, of a clip for locking the valve stem against withdrawal into the tire upon deflation of the tire comprising; an elongated rigid flat strip member, one end of said strip member having a longitudinal slot forming a forked end, the other end of said member being bent vertically to form an integral vertical end portion, said end portion having an opening, said forked end surrounding a vertically extending portion of the valve stem and the horizontal portion of the valve stem extending over said strip member and through said end portion opening, and means mounted on the valve stem for locking said clip to the valve stem, said means comprising a collar mounted on the valve stem and of larger diameter than said end portion opening, and an end cap for the valve stem having a shank bearing against said collar.

2. The combination with a tire, inner tube and rim assembly including an angular valve stem secured to said inner tube and having a short portion extending in a radial direction from the inner tube through an aperture in the central portion of the rim and a continuing angularly related laterally extending portion, of a clip for locking the valve stem against withdrawal into the tire upon deflation of the tire comprising; an elongated rigid flat strip member, one end of said strip member having a longitudinal slot forming a forked end, the other end of said member being bent vertically to form an integral vertical end portion, said end portion having an opening, said forked end surrounding a vertically extending portion of the valve stem and the horizontal portion of the valve stem extending over said strip member and through said end portion opening, and means mounted on the valve stem for locking said clip to the valve stem, said means comprising a rubber collar mounted on the valve stem and of larger diameter than said end portion opening, and an end cap for the valve stem having a shank bearing against said collar.

References Cited in the file of this patent

UNITED STATES PATENTS

| | | |
|---|---|---|
| 982,169 | Adams | Jan. 17, 1911 |
| 1,505,220 | Shay | Aug. 19, 1924 |
| 1,815,644 | Anderson | July 21, 1931 |
| 2,059,605 | Powell | Nov. 3, 1936 |
| 2,334,801 | Zimmerman | Nov. 23, 1943 |
| 2,580,343 | Benoit | Dec. 25, 1951 |

OTHER REFERENCES

Transportation Supply News, May 1955, page 11. Advertisement of Carlan Valve for Dual Tires at top right corner of page, cited as Carlan.

"Sav-A-Tir" publication (4 pages), July 22, 1957. Copy of the publication is filed in trademark application for "Sav-A-Tir," Serial No. 34,179, filed July 22, 1957, in the name of "Sav-A-Tir," 1296 Sylvan Rd., SW., Office 9, Atlanta, Ga. The trademark is published in the Official Gazette of Apr. 15, 1958.